Figure 1:
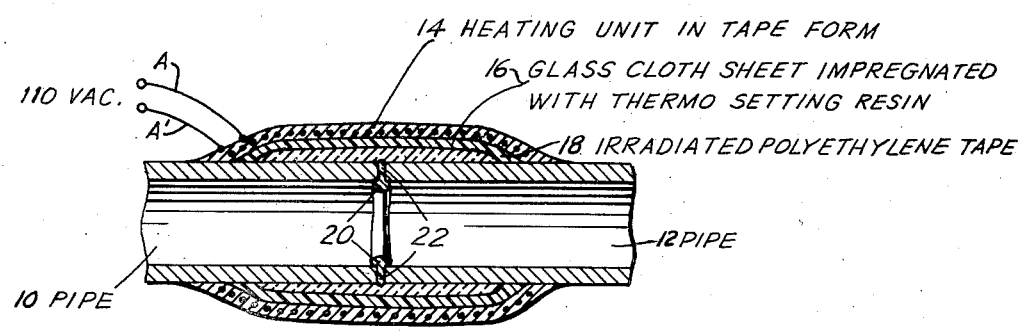

Feb. 15, 1966   B. M. JONES   3,235,289
BUTT JOINTS ON REINFORCED PLASTIC PIPE
AND METHOD OF FORMING SAME
Filed Dec. 27, 1961

INVENTOR.
Bliss M. Jones,
BY
ATTORNEYS

United States Patent Office 3,235,289
Patented Feb. 15, 1966

3,235,289
BUTT JOINTS ON REINFORCED PLASTIC PIPE
AND METHOD OF FORMING SAME
Bliss M. Jones, Rust Island, Mass., assignor to
Jones & Hunt, Inc., Gloucester, Mass.
Filed Dec. 27, 1961, Ser. No. 162,476
8 Claims. (Cl. 285—21)

This invention relates to a method of joining the ends of elongated members such as tubes, pipes, conduits, solid or hollow cylinders, or the like, and more particularly relates to a method and product whereby the ends of two reinforced plastic pipes are bonded together by means of a resin-impregnated material.

Heretofore known methods of joining the ends of elongated structural materials have required cumbersome machining or tooling of the ends of the members to be joined or necessitated the use of a special molded coupling for the ends of the members. Though these methods have been apparently satisfactory with regard to the effective joining of the ends of the members, the methods are expensive and time consuming. That is to say, the cost of machining or tooling the ends of the members to be joined and/or the manufacture of special molded couplings for the ends of the members are monetarily disproportionate with the results achieved. Further, the time required before the joined members can be used commercially is unreasonably long and from an economical standpoint unreasonable regarding lost time of equipment and labor.

One conventional method, now commonly in use, requires the following procedure: the ends of the members to be joined are cut square and coated with a catalyzed resin. The members are then positioned together and held firmly in place while strips of glass fiber matting or roving, impregnated with a catalyzed resin, are wrapped about the joint. Additional catalyzed resin is applied by brush or the like to the glass mat or roving to thoroughly saturate it. A roller is then manually applied so as to compress the glass and roll out any air trapped within the impregnated mat or roving. The above procedure is repeated for each layer of mat or roving desired or necessary to satisfy joint strength requirements. The curing period for the catalyzed resin of this method is greater than 24 hours in order to place the joined members in condition for use, though a semi-cure is reached after approximately 1 hour. It is apparent that this method is slow, messy, dirty and expensive from a standpoint of man hours required before the joined members may be put into commercial use. As a collateral disadvantage of this method, the physical characteristics and appearance of the joint are usually not acceptable.

Accordingly, one object of the present invention is to provide a novel and unique method of joining ends of elongated members which is inexpensive and time-saving and which produces joints which have excellent appearance and strength.

A further object of the present invention is to provide a method of joining the ends of pipes which is applicable to essentially all sizes of pipe and which requires no special skill on the part of the personnel employing the method yet which is susceptible of achieving an inexpensive, quick, neat and strong pipe joint.

A still further object of the present invention is to provide a method of joining the ends of pipes which will permit prompt use of the joined pipes under conditions in which the pipe is designed to withstand.

A yet still further object of the present invention is to provide a method of joining the ends of two pieces of reinforced plastic pipe without resort to tooling or machining and without the use of special couplings.

Another object of the present invention is to provide a method of forming butt joints on reinforced plastic pipe which comprises the curing in situ of a bonding material which is pre-impregnated with a thermo-setting resin cured to an intermediate stage, the pressure necessary to provide a strong joint being obtained by means of a tape which shrinks at or below the temperature necessary to cure said resin.

It is still another object of the present invention to provide a method of forming butt joints on reinforced plastic pipe which comprises the curing in situ of a bonding material which is pre-impregnated with a thermo-setting resin cured to an intermediate stage, the pressure necessary to provide a strong joint being obtained by means of a tape which shrinks at or below the temperature necessary to cure said resin, the curing temperature being provided by means of one or more novel heating units.

Figure 2:
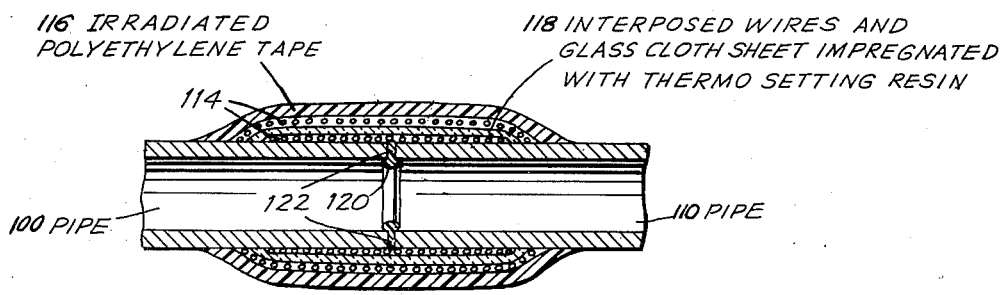

These and further objects and advantages of the invention will become more apparent upon reference to the following description, claims and the appended drawings wherein:

FIGURE 1 is a longitudinal cross-section of the joined pipes in accordance with the novel method disclosed; and FIGURE 2 is a longitudinal cross-section, similar to FIGURE 1, but showing a pipe joint in accordance with a modified novel method disclosed.

The first step in the process of the present invention is to prepare the pipes to be joined. The procedure is to cut square the ends of the pipes which are to be joined and to wipe clean any dirt, grease or metal filings. Next, a sheet of glass cloth impregnated with a thermo-setting resin, which has been taken to an intermediate stage of cure, is provided. For purposes of clarity and understanding, the glass cloth sheet will hereafter be referred to as the "pre-preg" sheet. The pre-preg sheet, when partially cured, is quite tacky or sticky and will stick to most any surface with which it comes in contact including the sheet itself.

Next, the pipes to be joined are butted together at their ends and the pre-preg sheet is wrapped around the butted ends. Since the pre-preg sheet is sticky, as above mentioned, it will adhere to the outer surfaces of the pipes and temporarily hold the pipes together. When wrapping the pre-preg sheet around the pipes, half of the sheet is wrapped on one pipe and the other half on the other pipe and as many layers are wrapped thereabout as are necessary to provide a joint whose strength is at least equal to the strength of the pipe.

Next, an irradiated polyethylene tape is spirally wound around the pre-preg sheet. To achieve the best performance of the tape, which will be more fully described below, each wind of the tape around the pre-preg sheet should overlap each prior adjacent wind; for example, a half overlap has been found to be desirable. The tape should completely cover the pre-preg sheet.

Lastly, sufficient heat is applied to the pre-preg tape-wrapped pipes to cure the resin of the pre-preg sheet and to bond it to the pipe sections being joined. The polyethylene tape, which has contributed to the joining of the pipe sections, as will be more fully described below, may be either left on or stripped off as desired, since no apparent advantage results from either procedure.

The temperature necessary to cure the resin in the pre-preg sheet and to satisfactorily bond the pre-preg sheet to the pipe is approximately 250°–300° F., this temperature being maintained, of course, for a sufficient period of time (i.e., 5 to 20 minutes, depending upon the thickness of the pre-preg wrapping) to effect a full and secure cure. Merely applying the quantity of heat necessary to cure the pre-preg sheet and to bond it to the pipe sections, however, does not provide a joint which has achieved its full potential as to strength, etc. To accomplish the latter, it is necessary that the pre-preg sheet be cured under both heat and pressure. More specifically, it is necessary that the pre-preg sheet be subjected to a pressure of at least approximately 5–30 p.s.i. to eliminate the voids and air pockets in the pre-preg sheet so as to obtain a cured product having satisfactory density and, accordingly, high strength. It is for this reason that the pre-preg sheet is wrapped with the irradiated polyethylene tape before the curing step.

As is well known, polyethylene tape, when properly irradiated, tends to shrink lengthwise as much as 40 to 50 percent. When such tape is wrapped about a pre-preg sheet which has previously been wrapped about the pipe sections to be joined, the tape is not free to shrink completely but the tendency of the tape to shrink results in the application of pressure to the pre-preg sheet. Under the temperature conditions necessary to cure the pre-preg sheet (i.e., 250°–300° F.), such tape will apply the pressure necessary (at least 5–30 p.s.i.) to give the cured pre-preg sheet its desired strength, etc. As a collateral advantage, the shrinkage of the polyethylene tape will also force some of the excess resin in the pre-preg sheet into the crevice formed by the butting of the pipe sections to be joined, further sealing the ends of the pipes and preventing passage of any liquid in the pipe wall through the glass reinforcement of the pipe by means of capillary action.

By way of example only, a reliable and satisfactory irradiated polyethylene tape is available commercially from the General Electric Co., under the name "Irrathene." General Electric's products are irradiated polyethylene encapsulation-grade insulating tapes and are radiation-linked oriented low density polyethylene films which have high-dieelectric strength, low power factor and low-dielectric constant. Further, the General Electric's "Irrathene" products have high longitudinal shrinkage when heated, which permits them to be used to encapsulate objects with an impervious wrap. The tapes are non-melting, completely resistant to environmental stress cracking, and are unaffected electrically by moisture. All necessary data pertaining to the General Electric "Irrathene" tapes are published in General Electric publication, "Insulating Materials Products Data," G.I.Z.–923, published October 15, 1958.

It is, of course, not necessary to use the particular irradiated tape described above. For example, irradiated polypropylene tape would perform the job adequately. Regardless of the tape used, however, the important feature of the present invention is to use a tape which, under the temperature conditions necessary to cure the resin in the pre-preg sheet, will shrink sufficiently, before the resin has cured completely, to apply the pressure necessary to ensure the obtaining of desirable properties of strength in the cured pre-preg sheet.

In this connection, one of the significant advantages resulting from the use of the General Electric "Irrathene" tape previously referred to, is that the temperature necessary to cure the pre-preg sheet (250°–300° F.) is the very temperature required to shrink the tape sufficiently to apply the desired pre-preg sheet curing pressure (at least 5–30 p.s.i.). This feature makes possible the curing and the imparting to the pre-preg sheet of desired properties of strength (as well as of appearance) in a single heating step.

The width of the shrinkable tape varies depending upon the size of the pipe to be joined, i.e., a 1 inch tape for a 2 inch pipe; a 9 inch tape for a 36 inch pipe. Tape thickness may satisfactorily vary from .004 inch to .008 inch.

In the foregoing description, the intermediate material wrapped around the abutting ends of the pipe sections to be joined was referred to as the "pre-preg" sheet and described as a sheet of glass cloth impregnated with a thermo-setting resin which has been taken to an intermediate stage of cure. A highly acceptable material for this purpose is a woven glass cloth impregnated with a polyester resin in the stage "B" of cure and sold by the Electro-Technical Products Division of the Sun Chemical Corporation of New Jersey.

The pre-preg sheet need not be the specific material mentioned above, however. The prime requisite in the choice of such material is that it be a material having the proper strength characteristics and that it be impregnated with a thermo-setting resin (i.e., polyester or epoxy resin) which is at an intermediate stage of cure and which, when cured, will bond to the material of the pipe sections to be joined. The material should be able to withstand the required curing temperatures and the resin utilized should have characteristics similar to those of the pipes, i.e., similar chemical and heat resistance characteristics.

The fabric of the pre-preg sheet should be a glass cloth, mat or woven roving, or a combination of these. Glass cloth is preferable when pipes of small diameter (i.e., 2 inches) are to be joined. The woven roving is preferred for larger diameter (i.e., 12 inches) pipes since it is thicker and heavier than the glass cloth and the required thickness of wrap may be obtained with fewer wraps and at lower cost. Combinations of these may be used for particular applications for purposes of combining their desirable properties.

The fabric of the pre-preg sheet should be oriented so that the strength around the pipe joint (viz. in a direction normal to the longitudinal axis of the pipe) is equal to that along the axis of the pipe. Thus the strength of the pre-preg in one direction should be equal to the strength at right angles to it.

Depending upon the particular pre-preg sheet chosen, the curing temperature may vary from the 250°–300° F. range previously suggested. The curing temperature may also vary depending upon the thickness of the pre-preg sheet, i.e., at 250°–300° F. 5 minutes for a $\frac{1}{16}$ of an inch wrap or 15 minutes for a $\frac{1}{4}$ inch wrap.

The heat for curing the resin of the pre-preg sheet and for shrinking the irradiated tape may be provided in a variety of ways, such as, by means of heat lamps, a hot air blower, heating pads, etc.

An acceptable and satisfactory electrical heating unit has been discovered to be a silicone rubber tape which has resistance wires imbedded therein. Such a tape may be wrapped around the irradiated tape and energized for a sufficient period of time to cure the resin of the pre-preg sheet and to bond it to the pipe sections being joined. The advantage of using a silicone rubber tape as the electrical heating unit is that the silicone rubber is resistant to heat, most materials and chemicals do not stick to it (such as resins), it is capable of experiencing excessive mechanical abuse and, most important, it is relatively inexpensive. The heating tape may vary in size depending upon the size of the pipe being joined, e.g., a 6 inch by 14 inch heating tape may be used for any pipe size up to 4 inches. Clearly, larger tapes may be used for larger diameter pipes.

A joint made according to the preceding description, utilizing a silicone rubber tape as the heating unit, is shown in FIGURE 1. Reinforced plastic pipes 10 and 12 are butted together at 22 and a glass cloth sheet impregnated with polyester resin 16 is wrapped around the butt 22. Wrapped around the glass cloth sheet is irradiated polyethylene tape 18 and positioned about the tape 18 is a silicone rubber heating unit 14 in tape form. The heating unit has electrical terminals A–A$^1$ which are connected to a conventional 110 volt, 60 cycle, alternating current power supply or connected to any power supply for which the heating unit is designed. It is to be understood that after the curing period is complete the heating unit 14 is removed and the pipes 10 and 12 are joined together and ready for use. Due to the force exerted by the tape 16 when heated by the heating unit 14, excess resin 20 is caused to creep through the butt 22 and to be cured or bonded thereto so as to further enhance and strengthen the pipe joint as previously described.

An alternate method of forming butt-joints, according to the present invention, involves the use of a heating unit different from that described above. This method is essentially the same as that previously described except that in lieu of a silicone tape heating unit wrapped about the shrinkable tape, insulated resistance wire are interposed between the layers of the pre-preg sheet and the shrinkable tape is wrapped about the wire-pre-preg combination. Thus, instead of being heated from without (as by means of the silicone rubber unit previously described), the pre-preg sheet and shrinkable tape are heated from within. After the curing operation, the resistance wires are imbedded in and are an integral part of the finished unit.

A joint formed in accordance with this modified method is shown in FIGURE 2. Pipes 100 and 110 are butted at 122 and wrapped with a glass cloth sheet 118 which is impregnated with thermo-setting resin, and resistance wires 114 are interposed between each layer of sheet 118. An irradiated polyethylene tape 116 is wrapped around the interposed resistance wires 114 and pre-preg sheet 118.

As above set forth, when the tape 116 is heated by the heat generated when current flows through resistance wires 114, the tape exerts a force upon the pre-preg sheet 118 and causes excess resin 120 to creep into butt 122 and to bond or cure to the butt 122, thereby providing a stronger joint and preventing capillary action of any liquid through the reinforced section of the pipe. It will be noted that a collateral advantage of the above modified method of joining the ends of pipes in accordance with the present invention, is that the interposed resistance wires subsequently bond and become permanently bedded within the finished unit and thereby greatly enhance the strength characteristics of the joint in a manner and for principles substantially the same as that which results from the manufacture of reinforced concrete, i.e., the use of metal rods interposed within the concrete before setting.

A specific example of the method described in connection with FIGURE 1 follows: two pieces of 3 inch polyester resin pipe reinforced with woven glass roving or a glass mat and having a 3/16 of an inch wall thickness are provided and one end of each pipe is squared. The squared ends of the pipes are butted together and wrapped with a 3 inch wide strip of a pre-preg sheet (glass cloth impregnated with polyester resin cured to the "B" stage of cure) until a thickness of 1/4 of an inch has been built up. The tape's tackiness and stiffness will hold the joined pipes in place. Irradiated polyethylene tape (i.e., G.E. 210 irradiated polyethylene tape, encapsulation grade) of 1 inch width and .004 inch thickness is then spirally wound about the pre-preg sheet with 1/2 inch overlap of the tape upon itself. A silicone rubber heating tape, 6 inches by 14 inches, is wrapped about the joint and the heating tape is then energized to provide a temperature of 250°–300° F. for about 15 minutes.

During this heating period, the polyethylene tape will apply sufficient pressure to properly cure the pre-preg sheet. The heating tape is then removed and the joined pipe sections are ready for use.

It should be apparent that various other modifications may be made on the foregoing without departing from the spirit of the present invention. For example, other heating means, such as, a printed circuit on the pre-preg sheet or the shrinkable tape, may be employed.

While the methods of the present invention as above set forth have been described in terms of joining the ends of pipes, it is to be understood that the term "pipes" should be broadly construed to include pipe fixtures (i.e., reducers, elbows, T's, etc.) hollow cylinders, and other tubular members. In addition, it will be evident that the methods of the present invention are equally applicable to the joining of any two elongated members, whether hollow or solid. By way of example, a reinforced plastic fishing rod, either hollow or solid, may be repaired in accordance with the present invention by squaring the broken ends of the rod and joining the squared ends in accordance with the above methods of the present invention. Accordingly, the joining of the ends of elongated solid as well as hollow members may be perfected pursuant to the present invention without departing from the scope thereof by the mere exercise of minor modifications regarding the type of bonding material, and/or shrinkable tape.

It is to be further understood that although the methods above set forth have been described in terms of forming butt joints of pipe members, the novel methods may also be applied to the repairing of cracked structural members so a positively bonded reinforced portion results about the cracked portion of the pipe members. Accordingly, the advantages above set forth with regard to the joining of the ends of pipes are also inherent within the finished unit when the methods of the present invention are used to repair a cracked pipe member.

It will be apparent from the foregoing that the novel methods of the present invention uniquely provide a joint as strong as or stronger than the members being joined yet is procedurally simple, efficient, fast and economical as to cost of materials and labor.

From the foregoing it will be seen that the present invention is uniquely adapted to obtain all of the ends and objects here and before set forth together with other advantages which are inherent in the device.

It will be understood that certain features and sub-combinations are of utility and may be employed without reference to other features and sub-combinations. This is contemplated by and is within the scope of the appended claims.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A pipe joint comprising: two end-abutted pipes each having an end to be joined and inner and outer surfaces; a cured resin-impregnated glass cloth surrounding and bonded to the outer surfaces adjacent the abutting ends of said pipes; a heat shrunk irradiated polyethylene tape spirally encapsulating said glass cloth about said pipe joint to form a tight impervious wrap; and a layer of cured resin bonded to said ends and inner surfaces of said pipes for sealing said ends and preventing capillary action of any liquid flowing in-between the abutting ends of said pipes.

2. A pipe joint comprising: two end-abutted pipes each having an end to be joined and inner and outer surfaces; a plurality of layers of cured resin-impregnated glass cloth surrounding and bonded to the outer surfaces of said pipes adjacent the abutting ends thereof insulated resistance wires interposed between said layers and bonded to said glass-cloth; a heat shrunk irradiated polyethylene tape spirally encapsulating said glass cloth about said pipe joint to form a tight impervious wrap; and a layer of cured resin bonded to said ends and inner surfaces of said pipes for sealing said ends and preventing capillary action of any liquid flowing in-between the abutting ends of said pipes.

3. A method of joining the ends of a plurality of members comprising the steps of bringing said members into abutting relationship to form a joint, wrapping a reinforcing material impregnated with a heat curable thermosetting resin at an intermediate stage of cure around the outer surfaces of the ends of said members, and heating and curing said thermosetting resin under pressure so as to force and bond said resin to said point.

4. The method of joining the ends of a plurality of members as defined in claim 3, wherein said pressure is applied by a heat shrinkable material wrapped around said impregnated material, said heat shrinkable material shrinking and exerting a compressible force upon said thermosetting material when heated.

5. A method of joining the ends of elongated tubular members comprising the steps of bringing the ends of such members into abutting relationship to form a joint, wrapping a bonding sheet impregnated with a heat curable thermosetting resin at an intermediate stage of cure, wrapping a heat shrinkable irradiated polyethylene material about said resin impregnated bonding material, and applying heat to said resin impregnated bonding material, and said irradiated polyethylene material so as to cure said resin under pressure exerted by said irradiated polyethylene material forcing the resin into said joint.

6. The method of joining the ends of elongated tubular members as defined in claim 5, wherein said resin impregnated bonding material and irradiated polyethylene material are heated to a temperature within 250° F. to 300° F. for a duration of from five to twenty minutes.

7. A method of joining the ends of elongated tubular members comprising the steps of bringing the ends of said members into abutting relationship to form a joint, wrapping a plurality of layers of a bonding sheet impregnated with a heat curable thermosetting resin at an intermediate stage of cure around the outer surface of the abutting ends of said members and the joint formed thereby, interposing resistance wires between the layers of said bonding sheet, wrapping heat shrinkable irradiated polyethylene material around said resin impregnated bonding sheet and resistance wires, heating said resin impregnated bonding sheet and irradiated polyethylene material by energizing said resistance wires, and curing the thermosetting resin under the pressure exerted by the shrinking polyethylene material thereby forcing and bonding said resin to said joint.

8. The method of joining the ends of elongated tubular members as defined in claim 7 wherein said thermosetting resin is heated to a temperature of 250° F. to 300° F. for a period of from five to twenty minutes.

References Cited by the Examiner

UNITED STATES PATENTS

| | | | |
|---|---|---|---|
| 2,719,907 | 10/1955 | Combs | 154—53.6 XR |
| 2,739,829 | 3/1956 | Pedlow et al. | 285—21 |
| 2,814,313 | 11/1957 | Tate | 156—190 XR |
| 2,930,634 | 3/1960 | Merritt | 156—304 |
| 2,992,457 | 7/1961 | Harrison | 154—43 |
| 3,022,209 | 2/1962 | Campbell | 156—306 |

FOREIGN PATENTS

| | | |
|---|---|---|
| 585,186 | 1/1947 | Great Britain. |
| 829,179 | 2/1960 | Great Britain. |
| 129,438 | 9/1959 | Russia. |

EARL M. BERGERT, *Primary Examiner.*